Feb. 12, 1952 — R. D. FAGEOL — 2,584,996
PRESSURE ACTUATED TRANSMISSION CONTROL UNIT
Filed July 16, 1949 — 3 Sheets-Sheet 1
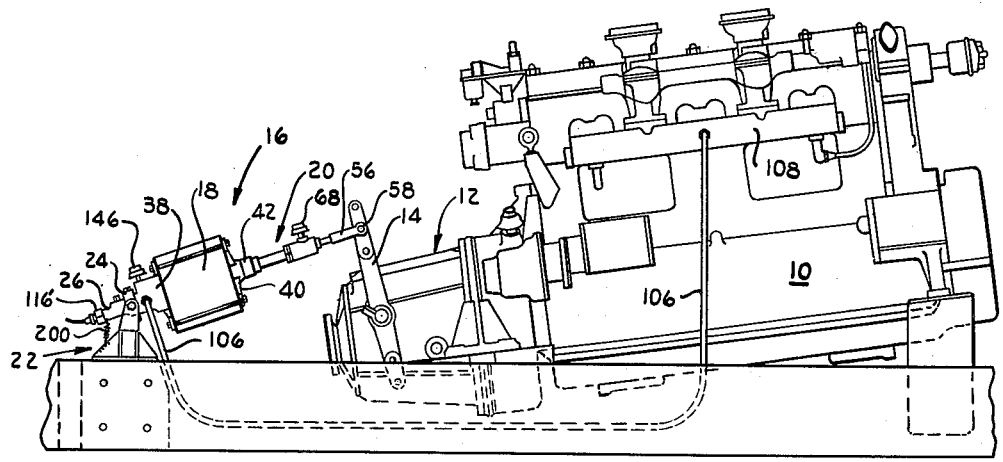
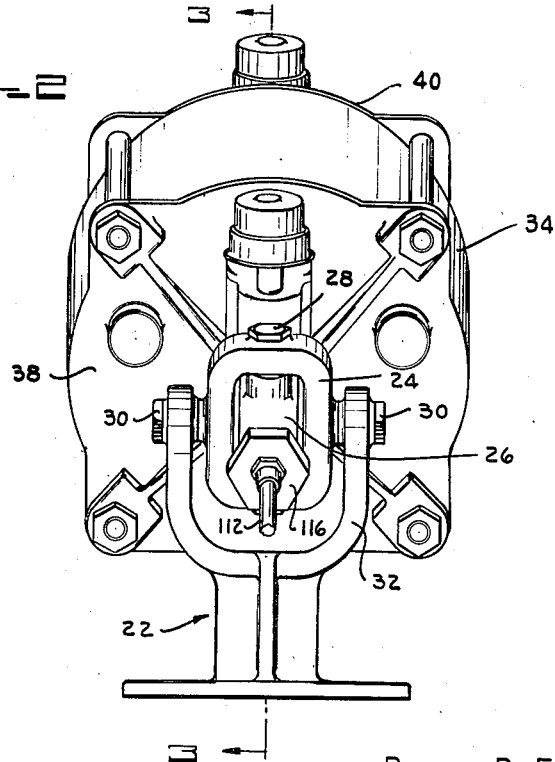
Inventor
ROBLEY D. FAGEOL
By E. J. Balluff
Attorney Feb. 12, 1952     R. D. FAGEOL     2,584,996
PRESSURE ACTUATED TRANSMISSION CONTROL UNIT
Filed July 16, 1949     3 Sheets-Sheet 2
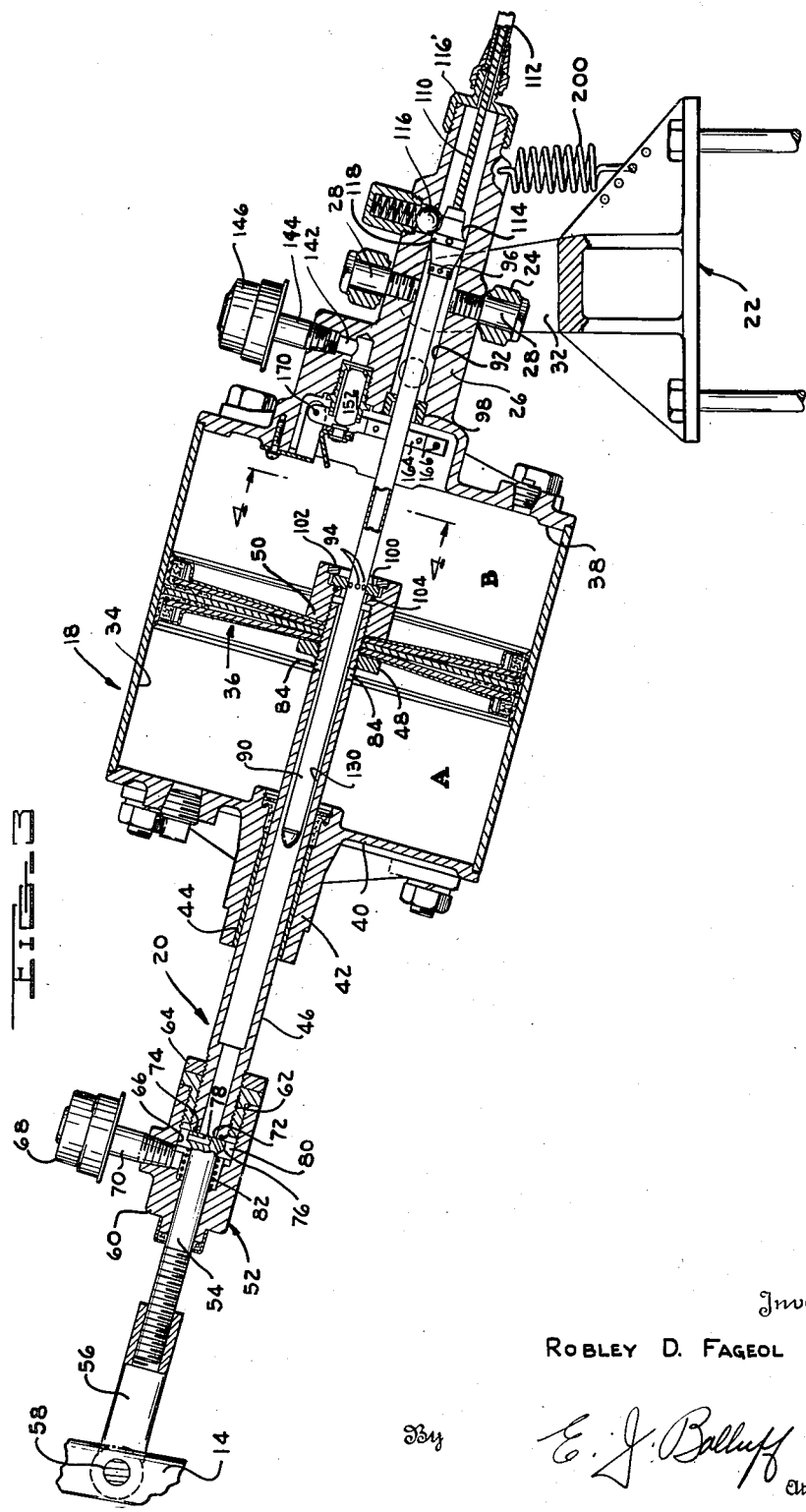
Inventor
ROBLEY D. FAGEOL

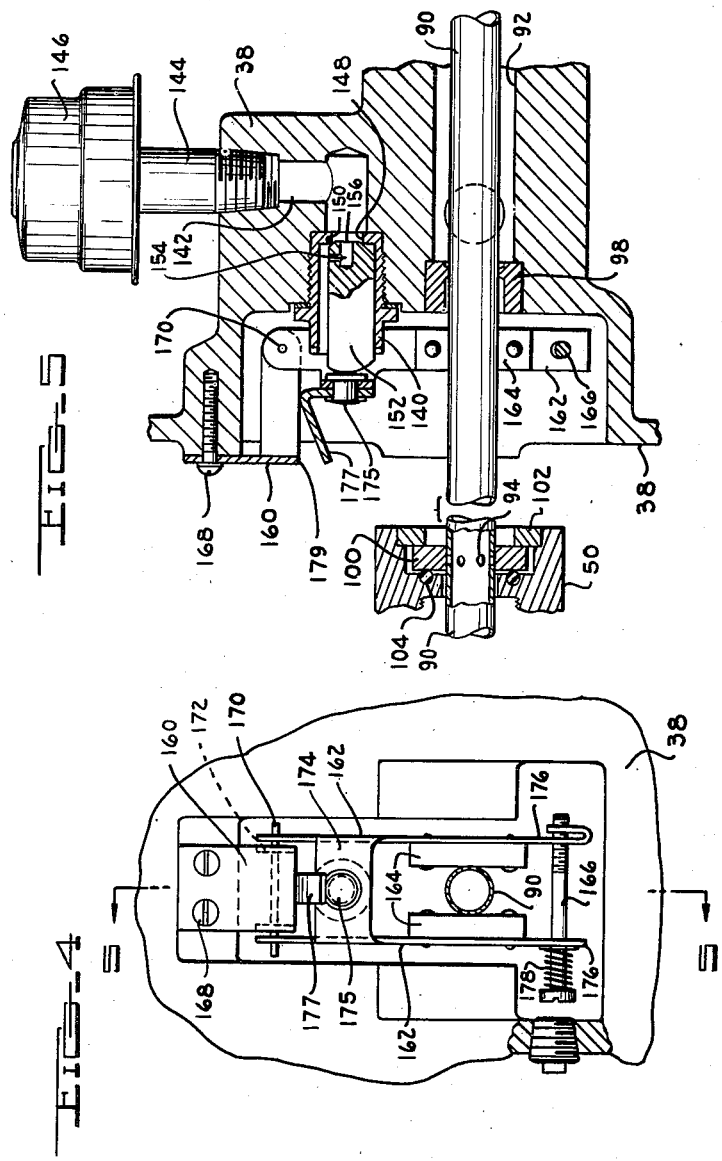

Patented Feb. 12, 1952

2,584,996

UNITED STATES PATENT OFFICE 2,584,996

PRESSURE ACTUATED TRANSMISSION CONTROL UNIT

Robley D. Fageol, Detroit, Mich., assignor to R. D. Fageol Company, Detroit, Mich., a corporation of Michigan Application July 16, 1949, Serial No. 105,230

12 Claims. (Cl. 121—41)

This invention relates to power units and has particular reference to a remote control power unit which is constructed and arranged for performing work, such for example as shifting a marine transmission into and out of reverse, neutral and forward gear positions, although it is to be understood that the invention is not limited to such application.

The invention contemplates a power unit having a reciprocating member for performing work and for which unit there is provided an operator-manipulated control device which may be remotely positioned relative to the power unit and forms part of a means for precisely controlling the energization thereof. The power unit is connected to a source of suction, such as the induction system of an internal combustion engine, and the control means regulates the application of suction to the power unit so as to effect and control the reciprocation of said member. The control means of the power unit is constructed and arranged so that the length of the work stroke of the reciprocating member and the movement thereof may be accurately and precisely controlled by the operator. The unit is provided with means for indicating the midway position of the reciprocating member.

Principal objects of the invention, therefore, are to provide:

A new and improved power unit of the type herein disclosed which is very sensitive and responsive to control by the operator;

A power unit in which the length of the work stroke and the movement thereof may be easily and accurately controlled by the operator;

A power unit in which the speed of the work stroke is relatively fast and the same in both directions so that the power unit will shift the transmission at least as rapidly as it may be manually shifted but without the effort required for manual shifting of the transmission;

A power unit in which the control therefor may be adjusted to a selected position without regard to the speed of operation of the power unit; and A power unit particularly adapted for shifting a marine transmission into and out of reverse and forward gear and which unit is constructed so as to be sensitive to the control of the operator so that the craft may easily be accurately maneuvered in close quarters.

Other and further objects of the invention will be apparent from the following description and claims and may be understood by reference to the accompanying drawings, of which there are three sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a side elevational view of a marine engine and transmission having a power unit embodying my invention associated therewith;

Fig. 2 is an enlarged rear elevational view of the power unit and showing the mounting therefor;

Fig. 3 is a longitudinal sectional view of the power unit taken generally along the line 3—3 of Fig. 2;

Fig. 4 is an enlarged fragmentary elevational view of the bleed valve associated with one end of the cylinder and taken along the line 4—4 of Fig. 3; and Fig. 5 is a fragmentary sectional view taken along the line 5—5 of Fig. 4.

As illustrated in Figs. 1 and 2, a device embodying the invention is there illustrated in connection with an internal combustion engine 10 and a transmission 12 of a marine craft, the transmission 12 commonly being designated a reverse gear or gear box. The transmission 12 is operatively arranged between the engine 10 and the propeller (not shown), and includes neutral, reverse and forward gear positions to which it may be adjusted so that the engine 10 may propel the craft either forwardly or reversely or be permitted to idle without rotation of the propeller. The transmission 12 is provided with a manually operable lever 14 which is operable for setting the transmission in any one of its positions, and as shown in Fig. 1 is in neutral position.

The power unit embodying the invention is indicated generally at 16 and comprises a piston and cylinder unit 18 having a connection indicated generally at 20 with the lever 14. A Y-shaped supporting bracket or standard indicated generally at 22 is arranged to support the other end of the piston and cylinder unit 18. A ring 24 surrounds an extension 26 from the unit 18. Pins 28 threadedly secured in the extension 26 diametrically opposite relative to each other form trunnions which are supported in bearings in ring 24 so that the unit 18 is free to pivot within limits about the axis of the pins 28 in the ring 24. Similar pins 30 arranged 90° relative to the pins 28 and journaled in the arms 32 and threadedly secured in the ring 24 form a pivotal mounting for the ring 24 in the bracket 22 so that the ring 24 is free to pivot relative to the bracket 22 about the axis of the pins 30. Mounting arrangements of this type are sometimes called gimbal rings and as herein employed provide a universal mounting for one end of the cylinder unit 18.

The power unit comprises the piston and cylinder unit 18 which includes a cylinder member 34, and piston member 36 reciprocally arranged in the cylinder member 34 for movement relative thereto between limit positions adjacent each end of the cylinder member. The cylinder member 34 has its ends closed by end walls or plates 38 and 40. The end wall 40 is provided with a central boss 42 having a bearing sleeve 44 therein. A piston rod or thrust member 46 is slidably arranged in the bearing member 44 and within the cylinder has threadedly secured thereto nuts 48 and 50 which clamp the rod 46 to the piston 36 so that the piston rod 46 will move with the piston 36. The piston rod 46 is hollow and forms a part of the connection 20 between the unit 18 and the shift lever 14.

The connection 20 further includes a bleed valve 52, a valve member 54, and a clevis 56 which is pivotally connected by a pin 58 to the lever 14. The clevis 56 is threadedly secured to the valve member 54. The bleed valve 52 comprises a valve body 60 in which the unthreaded end of the valve member 54 is slidable. The end of the piston rod 46 is threaded and is secured to the valve body 60 by a threaded bushing 62 locked in position by nut 64. The valve body 60 provides a valve chamber 66 to which air is admitted through the filter 68 and pipe 70. The valve member 54 is provided with a face 72 which seats on an annular resilient valve member 74 secured to and carried by the end of the piston rod 46. The bleed valve 52 is shown in its seated or closed position in Fig. 3 with the valve member 74 seated on the valve face 72.

The head 76 of the valve member 54 is provided with a restricted L-shaped passage 78, one end of which terminates in the face 72 and communicates with the interior of the piston rod 46 when the valve is in its seated position. The head 76 of the valve member 54 in which the passage 78 is formed is slidable in the valve chamber 66 and is relieved at its periphery, as indicated at 80, so that there is a restricted communication through the passage 78 between the hollow interior of the piston rod 46 and the valve chamber 66. A spring 82 disposed around the valve member 54 and reacting against the head 76 urges the face 72 on the head 76 against the annular valve member 74.

The piston 36 is shown in its neutral position which corresponds with the neutral position of the transmission 12. When the piston 36 moves toward the left (Fig. 3), the thrust thereof is transmitted through the piston rod 46, the valve member 54, the clevis 56, and the pin 58 to the shift lever 14, thereupon moving the same in a clockwise direction (Fig. 1) and the transmission into forward gear.

However, if from the position in which the parts are shown in Fig. 3 the piston 36 moves to the right, the pull of the piston rod 46 on the valve body 52 will move the valve member 74 away from the face 72, thereby opening the valve against the force of spring 82 and permitting the unrestricted flow of air through the filter 68, the pipe 70, the valve chamber 66, past the outer relieved portions 80 of the valve head 76 and between the valve face 72 and the annular valve member 74 into the interior of the piston 46, from which it may flow through the ports 84 into one end of the cylinder hereinafter designated chamber A.

During movement of the piston 36 to the right, and when the valve head 76 has compressed the spring 82 against the left side of the valve chamber 66, the valve body 52 will pull the valve member 54, clevis 56, pin 58 and the shift lever 14 to the right, thereby effecting a counterclockwise movement of the shift lever 14 (Fig. 1). When the piston 36 reaches the limit of its movement to the right, the spring 82 will cause the valve head 76 to move toward valve member 74 so that the face 72 of the valve member 76 will again seat on the valve member 74, thereby completing the counterclockwise movement of the shift lever 14 so as to complete the shifting of said transmission from neutral into reverse gear. Seating of valve head 76 against valve member 74 will shut off the unrestricted communication between atmosphere and the interior of the piston rod 46, whereupon the restricted passage 78 will again become operative to connect the interior of the piston rod 46 to atmosphere through the valve chamber 66, the pipe 70, and the filter 68.

The bleed valve 52 thus provides a means for unrestrictedly porting the chamber A of cylinder 34 to atmosphere when the piston 36 moves toward the right (Fig. 3). The unit further comprises a hollow valve member 90 which is telescopically arranged within the hollow piston rod 46. The valve member 90 is reciprocable relative to the piston rod 46 and the piston 36 and extends through chamber B into a chamber 92 formed within the extension 26 of the end wall 38. The hollow valve member 90 is provided with a series of ports 94 within the cylinder 34 and a series of ports 96 within the chamber 92. The valve member 90 is slidably arranged in a bushing 98 and a valve closure member 100, the latter being carried by the nut 50. The bushing 98 separates the chamber 92 from the chamber B. The piston 36 and the valve closure member 100 and the valve member 90 separate the chamber A from the chamber B.

The valve closure member 100 comprises an annular member which is disposed in a counterbore in the nut 50 and secured therein by ring 102. The member 100 slides against the inside face of the ring 102 and against an annular sealing member 104 secured in the bottom of the counterbore in the nut 50, and has a limited sliding movement transversely of the axis of the valve member 90 so that when the valve member 90 is assembled in the bushing 98 and the valve closure member 100, the valve closure member 100 may readily be aligned with the bushing 98. The valve closure member 100 when the valve member 90 is arranged as shown in Fig. 3, closes the ports 94.

The chamber 92 is connected with a source of suction. For example, a conduit 106 which is connected at one end to the end plate 38 as shown in Fig. 1, is connected at its other end to the induction manifold 108 of the engine 10 so that the suction in the manifold during engine operation will be communicated to the chamber 92 and to the interior of the valve member 90 through the ports 96. A flexible cable 110 of a Bowden wire 112 or the like is connected by a member 114 to the end of the valve member 90. A spring pressed ball detent 116 is engageable with a shoulder 118 on the member 114 so as to locate or indicate the neutral position of the piston 36 and of the shift lever 14. In other words, when the ball detent 116 is positioned adjacent the shoulder 118, as shown in Fig. 3, the transmission 12 is in neutral position.

The cable 110 is flexible and extends to a suitable operator-manipulated control so that by pushing or pulling on the cable 110 the valve 90 may be shifted in either direction relative to its closure member 100. For example, if the cable 110 is pulled to the right (Fig. 3) until the member 114 engages the cap 116' which secures the sheath of the Bowden wire 112 to the extension 26, the valve member 90 will be shifted to the right to one limit of its travel, whereupon the ports 94 will be exposed to the chamber B thereby porting suction to the chamber B, whereupon the piston 36 will move to the right and until the valve closure member 100 again closes the ports 94. It will be observed that the valve 90 is free to shift relative to the closure member 100. It should also be noted that when the piston 36 begins to move to the right, the bleed valve 52 will be unseated as previously described and the atmosphere will be unrestrictedly admitted to chamber A through the filter 68, pipe 70, chamber 66, the hollow piston rod 46, and the ports 84.

When the cable 110 and the valve-member 90 move to the right, the ball detent 116 will yield and ride over the shoulder 118, thereby permitting movement of the member 114 to the right (Fig. 3) past the detent 116. After the piston 36 has moved to the right a sufficient extent so that the valve closure member 100 will again close the ports 94, the valve head 76 will again seat on the valve member 74, thereby cutting off the unrestricted porting of atmosphere to the chamber A and restricting the porting to the bleed through the restricted passage 78. If the cable 110 is subsequently operated to shift the valve member 90 to the left, the ports 94 will then be exposed to the chamber 130 formed by the hollow interior of the piston rod 46 and suction will then be ported through the ports 84 to the chamber A.

The restricted atmospheric bleed to the chamber A afforded by the restricted passage 78 is not sufficiently great to dissipate or relieve the suction applied to the chamber A so that the piston 36 and rod 46 will move to the left. At this time the valve 52 is closed and the thrust of the piston 46 will be transmitted through the valve body 60, the valve member 54, and the clevis 56 to the shift lever 14 so as to shift the transmission into its forward gear position.

A means is provided for porting the chamber B to atmosphere when the piston 36 moves toward the left (Fig. 3), and this comprises a bleed valve which is most clearly shown in Figs. 4 and 5. A bushing 140 is threadedly secured in a cavity in the end plate 38, such cavity communicating through L-shaped passage 142, pipe 144, and filter 146 with atmosphere. The bushing has an opening therein defining a port 148 and a valve seat 150. A valve member or valve body 152 formed of stainless steel or any other suitable material is provided with a restricted L-shaped passage 154, one end of the passage opening into the face 156 which seats on the seat 150 and the other end of the passage 154 opening into the periphery of the body 152 which is slidable within the bushing 140 and is of smaller size than the interior of the bushing 140 so that air may flow between the body 152 and the interior of the bushing 140. The left-hand end of the bushing 140 (Fig. 5) opens into or communicates with the chamber B so that with the parts arranged as shown in Figs. 3 and 5 there is a restricted bleed between atmosphere and the chamber B.

The valve body 152 and bushing 154 comprise an atmospheric bleed or porting valve which, as illustrated in Figs. 3, 4 and 5, is in its closed position. The valve 52 may also be designated as an atmospheric bleed or porting valve. The device would function if the atmospheric porting valves were not provided with the restricted passages 78 and 154. However, such restricted passages prevent a vacuum lock of the unit and make it possible for the piston to begin moving as soon as the ports 94 are uncovered without waiting for either of the valves 52 or the valve 140, 152 to open.

A means is provided for effecting the opening of the valve member 152 when the hollow valve member 90 moves in a direction to port chamber A to suction, and this comprises a bracket 160, a lever 162, friction members 164, and adjusting screw 166. The bracket 160 is secured by screws 168 to the end plate 38. The lever 162 is pivoted by pin 170 to arms 172 of the bracket 160 and includes a connecting portion 174 which connects the two arms 176 of the lever 162. The connecting portion extends across and in spaced relation with the end of the bushing 140. A rivet 175 secures an L-shaped member 177 to the portion 174. The head of the rivet 175 is engageable with the end of the valve member 152 so as to move the valve member 152 to its seated position in which it is shown in Figs. 3 and 5. The left-hand projecting end of the member 177 is engageable with the portion 179 of the bracket 160 to limit the clockwise pivotal movement of the lever 162 on the bracket 160.

When the lever 162 swings in a clockwise direction the head of the rivet 175 will move away from the end of the valve member 152, thereby permitting opening of the valve 140, 152. That is, the valve member 152 may then move to the left and off of its seat 150 so as to provide an unrestricted communication from atmosphere to the chamber B through the filter 146, the pipe 144, the passage 142, the port 148, past valve member 152, and through bushing 140.

The arms 176 of the lever 162 straddle the valve member 90 and have secured thereto the friction members 164 which may be formed of any suitable material, such for example as pieces of leather which frictionally grip the sides of the valve member 90. The tension with which the friction members 164 grip the valve member 90 may be regulated by the screw 166, one end of which is threadedly secured in threaded holes in a U-shaped end of one of the arms 176, an unthreaded portion of the screw extending through a hole in the other arm 176 and a spring 178 being confined between the head of such screw 166 and such last-mentioned arm 176.

While the friction members 164 have a friction grip on the valve member 90, the valve member 90 is free to move with respect to the lever 162. With the parts arranged as shown in Figs. 4 and 5, when the valve member 90 moves to the left the arms 162 will move with it until the member 177 engages the portion 179 of the bracket 160, whereupon the lever 162 will stop and the valve 90 will continue to move. This action will make it possible for the valve member 152 to move off of its seat, which will happen immediately since the atmospheric pressure acting on the face 156 of the valve member 152 will cause it to follow or substantially follow the movement of the lever 162.

It will be remembered that immediately following movement of the valve member 90 to the left, the piston 36 will start to follow the movement of the valve member 90. Movement of the valve member 90 subsequently to the right (Fig. 5) will cause the lever 162 to return to the position in which it is shown in Fig. 5, and this will effect the seating of the valve member 152 on its seat since the head of the rivet 175 will engage the end of the valve member 152 upon counterclockwise pivoting of the lever 162 about the pin 170.

The atmospheric porting valve arrangement shown makes it possible to obtain fast and prompt movement of the piston 36 following shifting of the valve member 90. Because of this the power unit is sensitive and responsive to control by the operator and may be operated so as to shift the transmission rapidly into and out of forward and reverse gears and between such gears so as to make it relatively easy to maneuver the craft in close quarters.

It will further be observed that the only work required of the operator is to shift the valve 90 through the cable, and the only work involved in this connection is that required to overcome the small amount of friction between the parts as there is no positive connection between the valve 90 and the piston 36 which performs the work. The spring 200 connected to the extension 26 and the Y-shaped supporting bracket counterbalance the weight of the power unit.

The cooperation of the ball detent 116 with member 114 and shoulder 118 indicates the midway position of the valve member 90 and the piston 36 and consequently the neutral position of the transmission 12 so that the operator may gauge the extent of shifting of lever 14 and the extent to which the clutches of the transmission are engaged.

Certain of the subject matter disclosed herein is specifically described and claimed in copending applications Serial No. 74,050, filed February 2, 1949, and Serial No. 87,000, filed April 12, 1949, for "Pressure Actuated Transmission Control Unit."

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A power unit comprising a cylinder member, a piston member reciprocally arranged in said cylinder member for movement relative thereto between limit positions adjacent each end of said cylinder member, a hollow valve member reciprocally arranged relative to said piston member and forming a fluid flow passage, said passage being provided with a fluid port on the end of the valve member disposed within said cylinder member and said passage having a suction connection thereto exteriorly of said cylinder member, a valve closure member carried by and movable with said piston member relative to said hollow valve member and cooperable with said hollow valve member to close said port therein and to separate the space in said cylinder member on one side of said piston member from the space in said cylinder member on the other side of said piston member, said hollow valve member being shiftable relative to said piston member and closure member so as to uncover said port and being movable between limit positions spaced a distance at least as great as the stroke of said piston member relative to said cylinder member, means operable for selectively positioning said hollow valve member in either of its limit positions or in any position intermediate its limit positions, movement of said hollow valve member so as to position the port thereof on one side of said valve closure member uncovering said port and thereby applying suction to said cylinder member on one side of said piston member whereby said piston member will move relative to said cylinder toward said port until said valve closure member closes said port, said piston member and hollow valve member being constructed and arranged so as to be freely movable relative to each other so as to permit free movement of said hollow valve member from one of its limit positions to the other without thereby moving said piston member, an atmospheric bleed valve at one end of said cylinder member for admitting air at a restricted rate into said cylinder member on the other side of said piston member, said bleed valve being constructed and arranged to be opened for freely admitting air to said cylinder member on said other side of said piston member, and a connection between said bleed valve and said hollow valve member for opening said bleed valve upon the aforesaid movement of said hollow valve member to uncover said port.

2. A power unit according to claim 1 wherein said bleed valve comprises a valve orifice, a valve body having a restricted passage and cooperable with said orifice so that such passage limits the flow through said orifice in the seated position of said bleed valve body relative to said orifice, said connection between said bleed valve and said hollow valve member releasing said valve body so as to permit the movement thereof to its unseated position relative to said orifice thereby to permit unrestricted flow through said orifice into one end of said cylinder member.

3. A power unit comprising a cylinder member, a piston member reciprocally arranged in said cylinder member for movement relative thereto between limit positions adjacent each end of said cylinder member, a hollow valve member reciprocally arranged relative to said piston member and forming a fluid flow passage, said passage being provided with a fluid port on the end of the valve member disposed within said cylinder member and said passage having a suction connection thereto exteriorly of said cylinder member, a valve closure member carried by and movable with said piston member relative to said hollow valve member and cooperable with said hollow valve member to close said port therein and to separate the space in said cylinder member on one side of said piston member from the space in said cylinder member on the other side of said piston member, said hollow valve member being shiftable relative to said piston member and closure member so as to uncover said port and being movable between limit positions spaced a distance at least as great as the stroke of said piston member relative to said cylinder member, means operable for selectively positioning said hollow valve member in either of its limit positions or in any position intermediate its limit positions, movement of said hollow valve member so as to position the port thereof on either side of said valve closure member uncovering said port and thereby applying suction to said cylinder member on one side of said piston member whereby said piston member will move relative to said cylinder toward said port until said valve closure member closes said port, said piston member and hollow valve member being constructed and arranged so as to be freely movable relative to each other so as to permit free movement of said hollow valve member by said positioning means from one of its limit positions to the other without thereby moving said piston member, an atmospheric bleed valve associated with each end of said cylinder member for admitting air at a restricted rate into the ends of said cylinder member, each of said bleed valves being constructed and arranged to be opened so as to admit air into the end of said cylinder at a relatively unrestricted rate, one of said bleed valves being opened by movement of said piston member in one direction toward said port in said hollow valve member, the other of said bleed valves being opened by movement of said hollow valve member in one direction to uncover said port therein, said bleed valves being alternately opened.

4. A power unit comprising a cylinder member, a piston member reciprocally arranged for movement relative thereto between limit positions adjacent each end of said cylinder member, a hollow valve member reciprocally arranged relative to said piston member and forming a fluid flow passage, said passage being provided with a fluid port on the end of the valve member disposed within said cylinder member and said passage having a suction connection thereto exteriorly of said cylinder member, a valve closure member carried by and movable with said piston member relative to said hollow valve member and cooperable with said hollow valve member to close said port therein and to separate the space in said cylinder member on one side of said piston member from the space in said cylinder member on the other side of said piston member, said hollow valve member being shiftable relative to said piston member and closure member so as to uncover said port and being movable between limit positions spaced a distance at least as great as the stroke of said piston member relative to said cylinder member, positioning of said port of said hollow valve member on one side of said valve closure member uncovering said port and thereby applying suction to said cylinder member on one side of said piston member whereby said piston member will move relative to said cylinder toward said port until said valve closure member closes said port, an atmospheric porting valve comprising a valve orifice communicating with said cylinder member on the other side of said piston member and a valve body having an open and a closed position relative to said orifice, said porting valve being constructed and arranged to be opened for freely admitting air to said cylinder member on said other side of said piston member, and a connection between said valve body and said hollow valve member for opening said porting valve upon the initial movement of said hollow valve member in one direction and for closing said porting valve upon the initial movement of said hollow valve member in the opposite direction.

5. A power unit according to claim 4 wherein said porting valve is provided with a restricted atmospheric bleed operative when said porting valve is in its closed position.

6. A power unit comprising a cylinder member, a piston member reciprocally arranged in said cylinder member for movement relative thereto, a hollow valve member reciprocally arranged relative to said piston member and forming a fluid flow passage, said passage being provided with a fluid port disposed within said cylinder member and said passage having a suction connection thereto exteriorly of said cylinder member, a valve closure member carried by and movable with said piston member relative to said hollow valve member and cooperable with said hollow valve member to close said port therein and to separate the space in said cylinder member on one side of said piston member from the space in said cylinder member on the other side of said piston member, said hollow valve member being shiftable relative to said piston member and closure member so as to uncover said port and being movable between limit positions spaced a distance at least as great as the stroke of said piston member relative to said cylinder member, positioning of said port of said hollow valve member on one side of said valve closure member uncovering said port and thereby applying suction to said cylinder member on one side of said piston member whereby said piston member will move relative to said cylinder toward said port until said valve closure member closes said port, a porting valve associated with each end of said cylinder member, each of said porting valves being constructed and arranged to be opened so as to admit air into its end of said cylinder member at a relatively unrestricted rate when suction is applied to the other end of said cylinder member, one of said porting valves being connected to said piston member so as to be opened thereby upon movement thereof in one direction, the other of said porting valves being connected to said hollow valve member so as to be opened by the initial movement of said hollow valve member in one direction.

7. A power unit according to claim 6 wherein each of said porting valves has a restricted bleed associated therewith for admitting air at a restricted rate into the ends of said cylinder member when said porting valves are in their closed position.

8. A power unit comprising a cylinder member, a piston member reciprocally arranged in said cylinder member for movement relative thereto, a hollow valve member reciprocally arranged relative to said piston member and forming a fluid flow passage, said passage being provided with a fluid port disposed within said cylinder member and said passage having a suction connection thereto exteriorly of said cylinder member, a valve closure member carried by and movable with said piston member relative to said hollow valve member and cooperable with said hollow valve member to close said port therein and to separate the space in said cylinder member on one side of said piston member from the space in said cylinder member on the other side of said piston member, said hollow valve member being shiftable relative to said piston member and closure member so as to uncover said port and being movable between limit positions spaced a distance at least as great as the stroke of said piston member relative to said cylinder member, positioning of said port of said hollow valve member on one side of said valve closure member uncovering said port and thereby applying suction to said cylinder member on one side of said piston member whereby said piston member will move relative to said cylinder toward said port until said valve closure member closes said port, an atmospheric porting valve associated with one end of said cylinder member, said porting valve comprising a valve orifice in one of the end walls of said cylinder member and a valve body arranged to be seated or unseated with respect to said orifice, and means for controlling the opening and closing movement of said valve body by movement of said hollow valve member.

9. A power unit according to claim 8 wherein said means for controlling the opening and closing movement of said valve body comprises a valve actuating member movable in opposite directions with said hollow valve member, said valve actuating member upon movement thereof in one direction moving out of the path of said valve body so as to permit the opening of said valve, and said valve actuating member upon movement thereof in the opposite direction being engageable with said valve body for moving the same to its seat on said valve orifice.

10. A power unit according to claim 8 wherein said means for controlling the opening and closing movement of said valve body comprises a lost motion connection between said valve body and said hollow valve member.

11. A power unit according to claim 8 wherein said means for controlling the opening and closing movement of said valve body comprises a friction connection between said valve body and said hollow valve member.

12. A power unit comprising a cylinder member, a piston member reciprocally arranged in said cylinder member for movement relative thereto and separating the space inside said cylinder member into two chambers, means for porting suction alternately to said chambers including a manually opened suction valve which is constructed and arranged to be closed by said piston member, means for porting atmosphere alternately to said chambers comprising a porting valve for each end of said cylinder member, said suction and atmosphere porting valves being constructed and arranged relative to each other so that when one of said chambers is ported to suction the other of said chambers is ported to atmosphere and vice versa, said suction valve and piston member being constructed and arranged relative to each other so that each is free to move from one of its limit positions to the other independently of movement of the other, said atmospheric porting valves providing for the relatively unrestricted admission of atmosphere alternately to each of said chambers substantially simultaneously with the porting of suction to the opposite one of said chambers so that said piston member is immediately responsive to opening of said suction valve.

ROBLEY D. FAGEOL.

REFERENCES CITED

The following references are of record in the file of this patent:

UNITED STATES PATENTS

| Number | Name | Date |
|---|---|---|
| 812,017 | Carmichael | Feb. 6, 1906 |
| 1,781,868 | Bragg | Nov. 18, 1930 |
| 1,830,636 | Bragg | Nov. 3, 1931 |
| 2,212,955 | Price | Aug. 27, 1940 |

FOREIGN PATENTS

| Number | Country | Date |
|---|---|---|
| 320,435 | Great Britain | Oct. 17, 1929 |